UNITED STATES PATENT OFFICE.

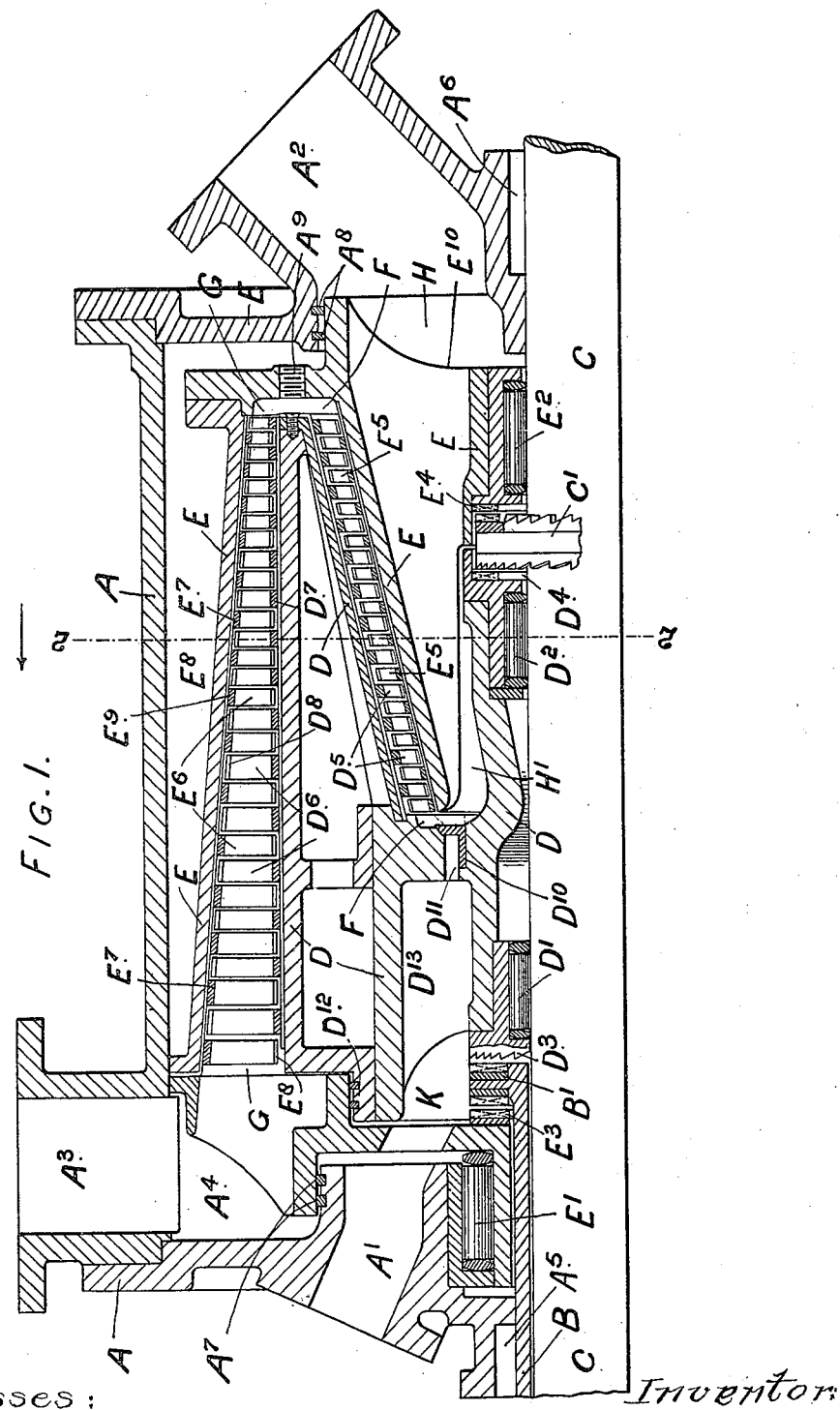

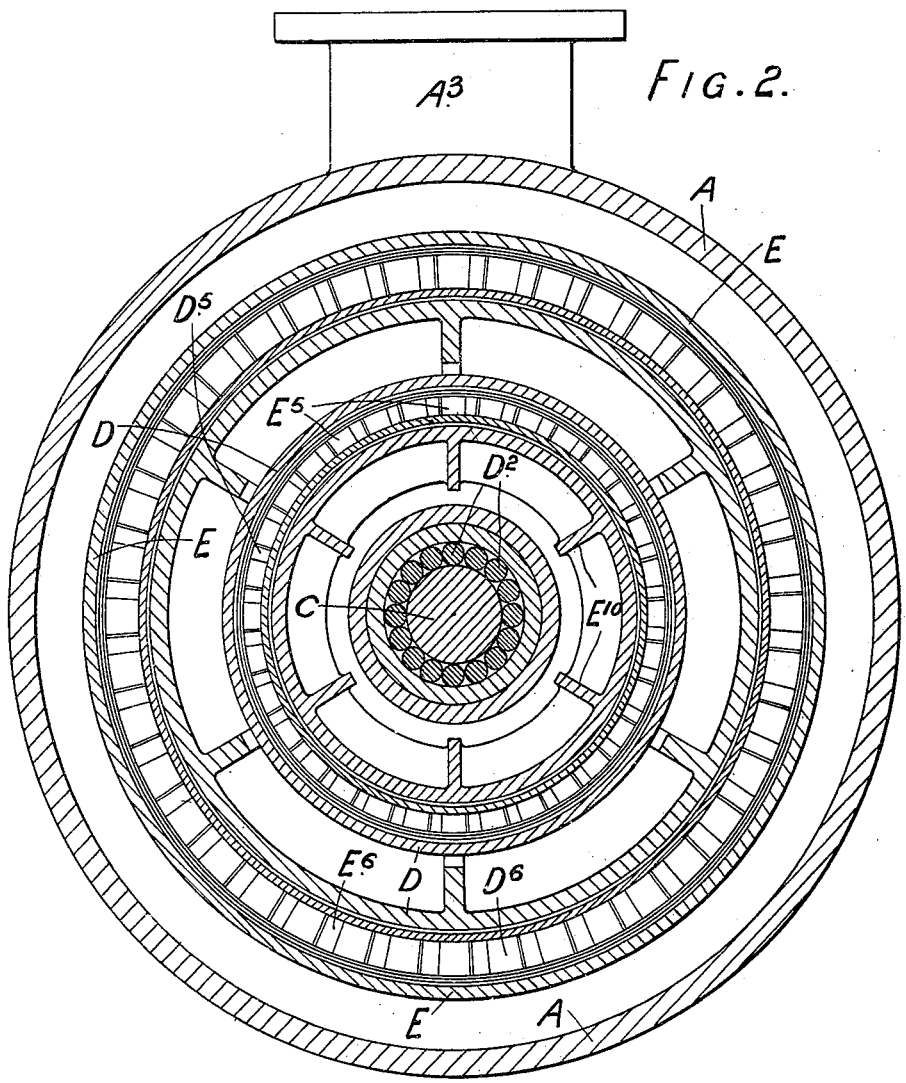

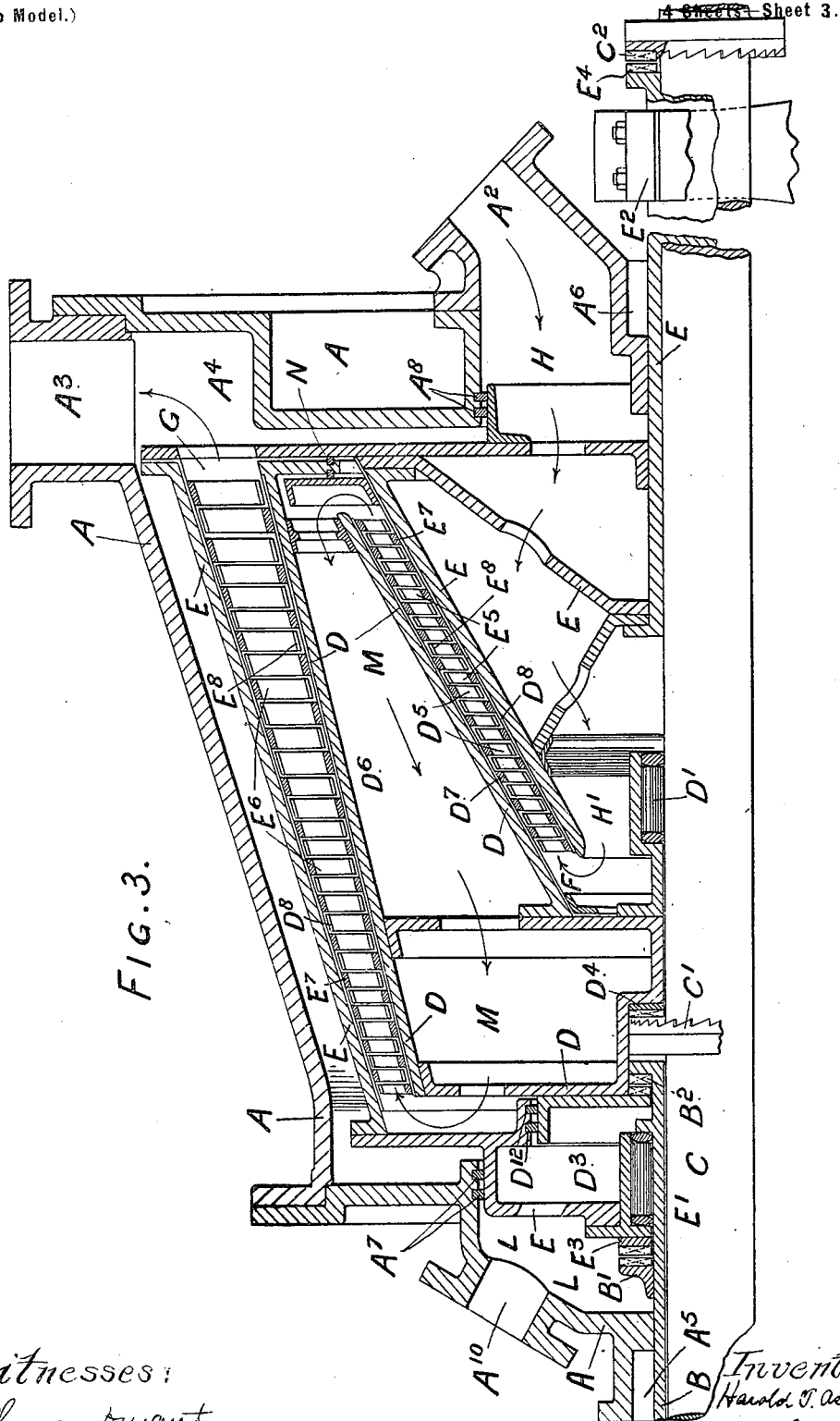

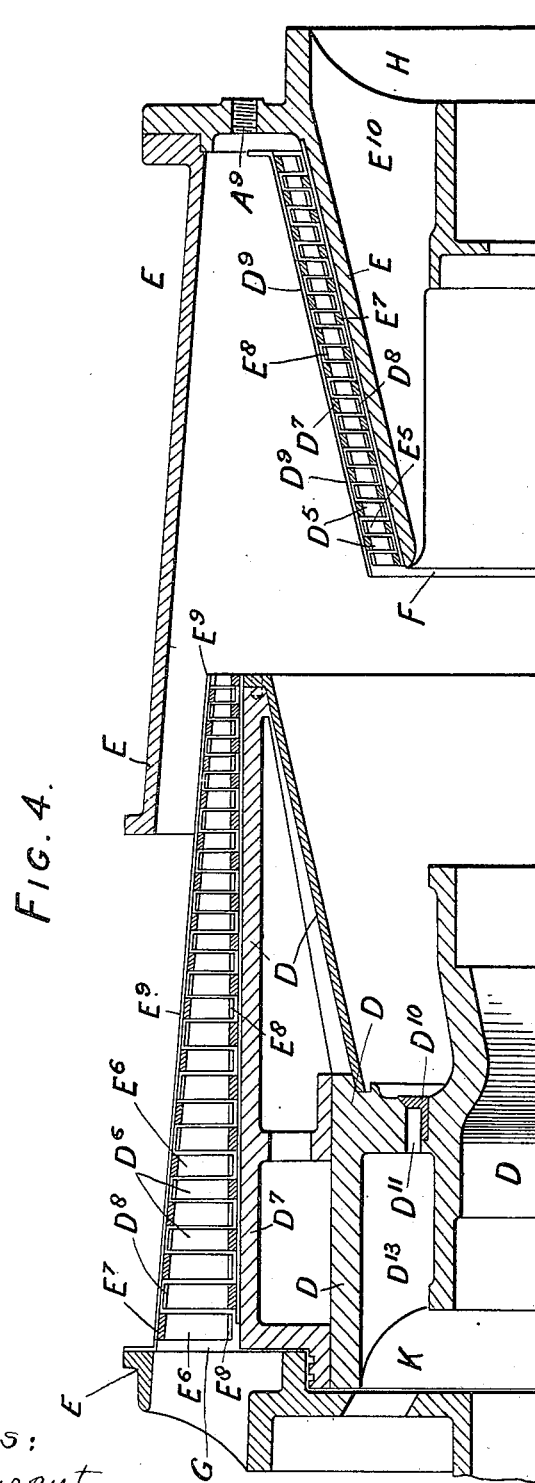

HAROLD THOMAS ASHTON, OF BLACKHEATH, ENGLAND.

EXPANSIVE-FLUID TURBINE.

SPECIFICATION forming part of Letters Patent No. 670,303, dated March 19, 1901.

Application filed August 18, 1900. Serial No. 27,317. (No model.)

*To all whom it may concern:*

Be it known that I, HAROLD THOMAS ASHTON, a subject of the Queen of England, residing at Blackheath, county of Kent, England, have invented certain new and useful Improvements in or Relating to Expansive-Fluid Turbines, (for which application has been made in Great Britain under No. 9,548, dated May 24, 1900,) of which the following is a specification.

This invention relates to expansive-fluid turbines, its primary object being the provision of improved means whereby the rotatable member or members can be engaged with or disengaged from a shaft or other driven portion and the direction of rotation of such portion reversed, other objects of the invention being to dispose the blades or other guides for the operating fluid and the parts which support them in such a manner that compactness and lightness are secured in the resulting structure and facilities for its erection and inspection are afforded.

In carrying out this invention the rotatable blade-carrying members are mounted upon their shafts so that they are movable endwise in relation thereto, and this movement, which may be brought about by any convenient means, is arranged to effect the engagement or disengagement of the rotatable members with the driven shafts.

The invention is particularly applicable to those turbines in which there are two rotatable blade-carrying members, which are so mounted that the operating fluid causes them to rotate in opposite directions within a common external casing. Two concentric or telescopic shafts are provided carrying clutch members, and adjacent clutch members are secured to the rotatable blade-carrying members, the clutches being so arranged that endwise movement of the members will cause either member to engage with either shaft, according to the direction in which the endwise movement takes place.

Although any convenient means may be used for effecting the endwise displacement of the rotatable members, it is preferred to bring about the movement by the action of the operating fluid itself—say by providing two oppositely-placed fluid-inlets, so that the operating fluid entering by either inlet will displace the rotatable members relatively to the shafts. For instance, the clutches may be so arranged that when one inlet is used the outermost rotatable member will engage with the inner shaft and the innermost member with the outer shaft, while when the other inlet is employed the outermost member is connected to the outer shaft and the innermost member to the inner shaft. It will be seen that the direction of rotation of the rotatable members remains unchanged; but the rotation of the shafts will be reversed in direction according to which of the inlets is used.

Although it is convenient to employ concentric shafts which are driven in opposite directions, the invention is of course applicable to turbines in which either of the oppositely-rotatable members can be coupled to a common shaft, the direction of rotation of which is reversed for going ahead or astern. In this construction one of the two members is held while the other rotates, the member which at any moment is not required for driving being locked either directly or through the shaft to which it is coupled to a stationary portion of the apparatus.

In the case of the application of this type of turbine to driving screw-propellers, for which it is particularly well adapted, when screw-propellers of opposite pitch are fixed on the inner and outer shafts, respectively, the reversal of direction in which the rotatable members are thrust by letting the working fluid in at either end of the casing is advantageous in that it permits the thrust of the working fluid to be constantly opposed to that transmitted through the propeller-shafts when going astern as well as when going ahead, and thus to relieve the thrust-bearings.

In a reversing-turbine having two inlet-conduits, as above described, it is necessary to prevent the working fluid from distributing itself equally throughout the casing, so as to put the working parts in balance, as this would hinder or prevent the endwise movement necessary to obtain reversal. For this purpose a valve may be fitted in the supply-passage leading to the high-pressure end of the system of blades, this valve being so made as to be free to move under the action of working fluid coming from either end of the apparatus when first admitted and to wholly or partially block the passage of the working fluid to the opposite end. By this device the desired preponderance of pressure is secured at one end of the machine and endwise movement of the working parts for the purpose described is made certain.

When it is desired to reverse the operation of the apparatus, the rotating parts are preferably brought to rest, or nearly so, by a brake before the supply of working fluid is again turned on. If concentric shafts are used, it is convenient to brake one shaft against the other, as by doing so both shafts may be brought to rest without the setting up of any material angular reaction upon the stationary parts of the apparatus. If friction-clutches are used upon the clutch members described, brought into action by the endwise movement of the rotating parts, they practically will constitute such a brake. The application of a braking device is, however, merely a precautionary measure, and details concerning it form no part of the present invention.

It is preferable that the bearings by which the rotating parts are supported upon the shafts should be made within the external casing of the apparatus for compactness and in order that the only steam-tight joints needed may be toward the exterior of the apparatus relatively to the bearings, this arrangement conducing to simplicity of construction. That these internal bearings may not need to be entirely screened from access of the working fluid it is both possible and convenient to employ roller-bearings or the like.

In the preferred construction the blades and their supporting members are so arranged that two or more concentric or coaxial annular passages are formed by the intercalating-blades and the working fluid is caused to pass through these annular passages "in series"—that is, the turbine comprises two parts, one enveloped by the other, through which the working fluid passes successively, entering at the high-pressure end of the inner part and passing to the exhaust after traversing and operating upon the blades of the outer portion. By this construction the total length of the apparatus, and in some instances its weight, is materially reduced.

In order to facilitate the assembling of the parts and the erection of the complete turbine, some of the members which support the blades may be made in segments or such members may be provided with detachable sleeves or liners to which the blades are attached. By this means it is possible to temporarily center the blades which are ultimately to be attached to one member upon the other member, so that the other member, with its two sets of blades, can be introduced bodily into the one member and the blades upon the detachable support afterward secured in their proper positions. To effect this operation, suitable hand-holes or other openings are provided, which may be closed by plugs when the apparatus is running. Conveniently each annular series of blades may be supported within a circumferential ring or inclosed within two such rings.

In the accompanying drawings, Figure 1 is a half-longitudinal central section of one form of turbine according to this invention. Fig. 2 is a complete transverse section on the line 2 2 of Fig. 1 and viewed in the direction of the arrow. Fig. 3 is a half-longitudinal central section of another form of turbine according to this invention. Fig. 4 is a diagram illustrating a method of erecting a portion of the turbine shown in Figs. 1 and 2.

Like letters indicate like parts throughout the drawings.

With reference first to Fig. 1, an external casing A surrounds the operative parts of the turbine and has inlets $A'$ $A^2$ and an outlet $A^3$, leading from a chamber $A^4$, for the passage of the operating fluid. Concentric shafts B and C enter the casing A through a stuffing-box $A^5$. The outer shaft B terminates inside the casing A and has fixed on it a double-faced clutch $B'$. The inner shaft C, which is also provided with a double-faced clutch $C'$, extends through the casing A and projects therefrom through the stuffing-box $A^6$. Suitable bearings and thrust-blocks for the shafts B and C are placed outside the casing A, but are not shown in the accompanying drawings. An inner rotating turbine member D, having bearings $D'$ $D^2$ on the inner shaft C, is surrounded by an outer rotating member E, which has bearings $E'$ on an inner portion of the casing A and $E^2$ on the inner shaft C. As the bearings $D'$, $D^2$, $E'$, and $E^2$ need not make fluid-tight joints with the surfaces on which they bear, roller-bearings or the like are preferably provided, as shown in the drawings. The members D and E rotate in opposite directions and may be moved longitudinally with relation to the shafts B and C, but not relatively to one another. Fluid-tight joints between the rotating member E and the casing A are placed at $A^7$ and $A^8$, and a similar joint between the members D and E is provided at $D^{12}$. The inner member D has clutches $D^3$ $D^4$ to coöperate with the clutches $B'$ and $C'$ on the shafts B and C, respectively, and the outer member E also has clutches $E^3$ $E^4$ for a similar purpose. These clutches are so arranged that in one position of the mechanism the inner rotating member D is engaged with the outer shaft B and the outer rotating member E with the inner shaft C, and in the other position of the mechanism the inner member D is engaged with the inner shaft C and the outer member E with the outer shaft B. A central position of the mechanism shown in the drawings is provided in which the members D and E are disconnected from the shafts B and C. The rotating members D and E are so disposed as to form annular passages or conduits F and G between their working surfaces. Projecting into these conduits F and G are coaxial rows of blades $D^5$ $D^6$ and $E^5$ $E^6$, these blades being mounted on the rotating members D and E, respectively, in the manner hereinafter described. During the erection of the turbine and before the rotating members D and E are in position the blades $D^5$ $D^6$ and $E^5$ $E^6$ are conveniently mounted thereon in the following manner:

Referring to Fig. 4 and taking the outer portion of the inner member D, for example, the first set of blades $E^6$, which are preferably mounted between two concentric rings $E^7$ and $E^8$, is slipped, together with these rings, along the surface of the member D to the position this set of blades will occupy relatively to the member D when both the members D and E are in place. In this position the set of blades $E^6$ is left for the time being. The next set of blades $D^6$, mounted between its concentric rings $D^7$ and $D^8$, is then slipped along the surface of the member D to its correct position, where it is fixed to that member by screws or other means. Sets of blades $D^6$ and $E^6$ are thus alternately slipped into position on the member D, the sets $D^6$ being fixed to the member and the sets $E^6$ being left loose thereon. A conical sleeve $E^9$, which may be divided longitudinally into segments, if required, is now placed over the whole and the loose sets of blades $E^6$ fastened thereto by any suitable means. The inner portion of the member E is served in a similar manner, the blades $D^5$, belonging to the member D and mounted between concentric rings $D^7$ $D^8$, being fastened to a sleeve $D^9$. The members D and E may now be pushed axially one into the other, as required, and the sleeves $D^9$ and $E^9$ fixed to their respective members D and E. Hand-holes, such as $A^9$, may be provided to facilitate this final fixing, these hand-holes being suitably closed after the turbine is erected. The sleeves $E^9$ and $D^9$ act thus merely as means of attaching the blades to the members E and D, upon which latter dependence is placed for circumferential strength and stiffness in working.

The operation of the turbine is as follows: To drive "ahead," the operating fluid is caused to enter by the inlet $A^2$ the annular chamber H, whence it passes through axial conduits between the webs $E^{10}$, which connect the parts of the rotatable member E to the annular chamber H'. These webs are so disposed as to impede the operating fluid as little as possible. A valve $D^{10}$ is situated at one end of an annular series of ports $D^{11}$ in the member D, opening into one side of the chamber H'. This valve $D^{10}$ is moved to the position shown by full lines in Fig. 1 by the pressure of the operating fluid acting against the end of the annular chamber H', this pressure when the port $D^{11}$ has been closed by the valve $D^{10}$ moving the rotating members D and E bodily endwise. This movement causes the inner member D to engage with the outer shaft B by means of the clutches $D^3$ and B' and the outer member E to engage with the inner shaft C by means of the clutches $E^4$ and C'. If no valve were provided to the port $D^{11}$, the operating fluid passing through this port and into an annular chamber K would tend to cause a back pressure and prevent the members D and E from being moved as required. After moving the valve $D^{10}$ the operating fluid passes first through the annular conduit F and then through the conduit G in a general direction parallel with the axis of the shafts B and C, impinging on the blades $D^5$ $E^5$ and $D^6$ $E^6$ as it does so, and thereby causing the members D and E to rotate in opposite directions, the blades on these members being so arranged as to produce this effect. The operating fluid then passes into the air or into a condenser by the exhaust-passage $A^3$. To reverse the direction of motion of the shafts B and C, the supply of fluid is cut off at the inlet $A^2$ and the mechanism brought to rest, preferably by any suitable brake. The operating fluid is admitted by the inlet A', from whence it passes into the annular chamber K through the opening between the webs $D^{13}$. Entering the port $D^{11}$, the valve $D^{10}$ is forced into the position shown by dotted lines in Fig. 1, thereby blocking the way to the chamber H' and preventing the fluid entering therein and setting up a back pressure. The pressure in the chamber K causes the members D and E to be moved endwise in such a direction as to disengage the inner member D from the outer shaft B and engage it with the inner shaft C by means of the clutches $D^4$ and C' and at the same time to disengage the outer member E from the inner shaft C and engage it with the outer shaft B by means of the clutches $E^3$ and B'. From this point the operating fluid passes through the annular conduits F and G and out at the exhaust-passage $A^3$, rotating the members D and E in the same direction as before, and consequently reversing the direction of rotation of the shafts B and C, as was required.

A modified form of turbine according to this invention is illustrated in Fig. 3, the chief points of difference being as follows: The operating fluid always enters the casing A at the inlet $A^2$, both when the shafts B and C are being driven ahead and when they are being driven "astern." The inlet $A^{10}$ leads to a chamber L in the casing A, this chamber having parts of its walls formed by portions of the rotatable members D and E. An annular chamber M is provided between the annular conduits F and G, the fluid in this arrangement being operative when passing through the conduit F, inoperative when returning through the chamber M, and finally operative as it traverses the conduit G. The fluid is prevented from passing direct from the end of the conduit F to the end of the conduit G by the rotating fluid-joint N, which may be kept tight by suitable packing. The inner rotating member D has only one bearing—viz., D'—and of the bearings of the outer member E that marked E' bears on the outer shaft B, while $E^2$ is fixed to any suitable support outside of the casing A. Single-faced clutches B' B² C' C² are fixed on the shafts B and C, respectively, the clutch C² being outside of the casing A. When it is required to drive ahead, the operating fluid is admitted through the inlet A² and acts on the members D and E, so as to move them endwise until the inner member D engages with the inner shaft C by means of the clutches C' and D⁴, and the outer member E similarly engages with the shaft B. The operating fluid then continues its passage along the annular chambers H H', the annular conduit F, the chamber M, and the conduit G to the exhaust-outlet A³. In the conduits F and G it impinges on the blades D⁵, D⁶, E⁵, and E⁶, and thereby rotates the members D and E in opposite directions. To drive the shafts B and C in the reverse direction, or astern, the chamber L is put in communication with the operating-fluid reservoir, the pressure therefrom causing the side of the chamber L, together with the members D and E, to move endwise until the inner member D engages with the outer shaft B and the outer member E with the inner shaft C by means of the clutches B² D³ and C² E⁴, respectively. The operating fluid entering at A² takes the same course as before. When driving ahead, the pressure in the chamber L is reduced so as to allow the fluid-pressure from the opposite end to take effect and move the rotating members D and E. This reduction of pressure may be effected by putting the chamber L in communication with the air or a condenser. When reversing, the members D and E are subjected to an endwise pressure due to fluid entering at A² and also to another endwise pressure due to the fluid in the chamber L. This latter pressure is greater than the former and acts in an opposite direction. This is necessary to keep the clutches B² D³ and C² E⁴ in gear and is obtained by suitably proportioning the area of the movable walls of the chamber L.

The same general arrangement of working parts may, if desired, be used in a turbine which is not intended for reversal, the various parts in that case being so proportioned as to give any desired endwise pressure on either or both of the rotatable members.

In the improved turbines it is not essential that the blades themselves should move endwise with the members which carry them in order to effect the reversal, for, if desired, the rotatable members may be so constructed as to be capable of the necessary endwise movement within the encircling blades with which they rotate.

What I claim as my invention, and desire to secure by Letters Patent, is—

1. In an expansive-fluid turbine the combination of coaxial shafts, coaxial rotatable members capable of endwise movement relatively to the shafts, clutch members upon the rotatable members, adjacent clutch members upon the shafts and means for causing the rotatable members to move endwise relatively to the shafts so that either rotatable member may be coupled to either shaft substantially as set forth.

2. In an expansive-fluid turbine the combination of coaxial shafts, coaxial rotatable members capable of endwise movement relatively to the shafts, clutch members upon the rotatable members, adjacent clutch members upon the shafts and inlets for an operating fluid so disposed that the entering fluid will cause either rotatable member to automatically engage with either shaft substantially as set forth.

3. In an expansive-fluid turbine the combination of coaxial shafts, coaxial rotatable members capable of endwise movement relatively to the shafts, clutch members upon the rotatable members, adjacent clutch members upon the shafts, inlets for an operating fluid so disposed that the entering fluid will cause either rotatable member to automatically engage with either shaft and a valve between the fluid-inlets operating to prevent direct communication between them substantially as set forth.

4. In an expansive-fluid turbine the combination of a rotatable member coaxial blade-carrying surfaces upon the member, blades upon the surfaces, a second rotatable member situated within the first member, coaxial blade-carrying surfaces upon the second rotatable member, blades upon those surfaces which intercalate with the blades on the adjacent surfaces of the other rotatable member, coaxial driven shafts, clutch members upon the shafts, adjacent clutch members upon each rotatable member, inlets for an operating fluid so disposed that the entering fluid will cause either rotatable member to automatically engage with either driven shaft and conduits for the fluid so arranged that said fluid passes first between the inner rows of intercalating blades and then between the outer rows substantially as set forth.

5. In an expansive-fluid turbine the combination of a rotatable member, coaxial blade-carrying surfaces upon the member, blades upon the surfaces, a second rotatable member situated within the first member, coaxial blade-carrying surfaces upon the second rotatable member, blades upon those surfaces which intercalate with the blades on the adjacent surfaces of the other rotatable member, coaxial driven shafts, clutch members upon the shafts, adjacent clutch members upon each rotatable member, inlets for an operating fluid so disposed that the entering fluid will cause either rotatable member to automatically engage with either driven shaft, a valve between the fluid-inlets operating to prevent direct communication between them and conduits for the fluid so arranged that said fluid passes first between the inner rows of intercalating blades and then between the outer rows substantially as set forth.

6. In an expansive-fluid turbine the combination of a rotatable member, coaxial blade-carrying surfaces upon the member, a second rotatable member situated within the first member, blades upon the blade-carrying surfaces of one member, a detachable support to which the blades of the other member are secured so arranged that the support and the blades may be temporarily centered upon the one member and placed in position within the other member to which they are finally attached, coaxial driven shafts, clutch members upon the shafts, adjacent clutch members upon each rotatable member, inlets for an operating fluid so disposed that the entering fluid will cause either rotatable member to automatically engage with either driven shaft, and conduits for the fluid so arranged that said fluid passes first between the inner rows of intercalating blades and then between the outer rows substantially as set forth.

7. In an expansive-fluid turbine the combination of a rotatable member, coaxial blade-carrying surfaces upon the member, a second rotatable member situated within the first member, blades upon the blade-carrying surfaces of one member, a detachable support to which the blades of the other member are secured so arranged that the support and the blades may be temporarily centered upon the one member and placed in position within the other member to which they are finally attached, coaxial driven shafts, clutch members upon the shafts, adjacent clutch members upon each rotatable member, inlets for an operating fluid so disposed that the entering fluid will cause either rotatable member to automatically engage with either driven shaft, a valve between the fluid-inlets operating to prevent direct communication between them and conduits for the fluid so arranged that said fluid passes first between the inner rows of intercalating blades and then between the outer rows substantially as set forth.

8. In an expansive-fluid turbine the combination of a rotatable blade-carrying member, a second blade-carrying member coaxial with the first and rotatable in the opposite direction, one of said members enveloping the other, inner and outer coaxial rows of blades upon the first member, corresponding coaxial rows of blades upon the second member and conduits for an operating fluid so arranged that said fluid passes first through the annular passages formed by the inner rows of intercalating blades and then through similar passages formed by the outer rows; substantially as described.

9. In an expansive-fluid turbine the combination of a blade-carrying member a second blade-carrying member coaxial with the first member and rotatable relatively to it, inner and outer coaxial rows of blades upon the first member, corresponding coaxial rows of blades upon the second member, a detachable support to which the blades of one of the blade-carrying members are secured so arranged that the support and the blades may be temporarily centered upon the one member and placed in position within the other member to which they are finally attached.

In testimony whereof I have signed my name to this specification in the presence of two subscribing witnesses.

HAROLD THOMAS ASHTON.

Witnesses:
   GEO. J. B. FRANKLIN,
   WALTER J. SKERTEN.